US011596887B2

(12) United States Patent
Zahaf

(10) Patent No.: US 11,596,887 B2
(45) Date of Patent: Mar. 7, 2023

(54) AIR FILTER GUARD

(71) Applicant: Samir Zahaf, Miami, FL (US)

(72) Inventor: Samir Zahaf, Miami, FL (US)

( * ) Notice: Subject to any disclaimer, the term of this patent is extended or adjusted under 35 U.S.C. 154(b) by 886 days.

(21) Appl. No.: 16/402,959

(22) Filed: May 3, 2019

(65) Prior Publication Data

US 2020/0346151 A1    Nov. 5, 2020

(51) Int. Cl.
*B01D 46/00* (2022.01)
*B01D 46/10* (2006.01)
*B01D 46/52* (2006.01)
*F24F 13/20* (2006.01)
*F24F 13/28* (2006.01)

(52) U.S. Cl.
CPC .......... *B01D 46/0016* (2013.01); *F24F 13/20* (2013.01); *B01D 2265/06* (2013.01)

(58) Field of Classification Search
CPC ............ B01D 46/0005; B01D 46/0041; B01D 46/10; B01D 2265/06; B01D 2271/02; B01D 2275/205; B01D 2279/50; F24F 13/20; F24F 13/28; F24F 7/065; F24F 12/006
USPC ................... 55/490, 495, 498, 502, DIG. 31; 277/616, 626, 637, 641, 642, 647
See application file for complete search history.

(56) References Cited

U.S. PATENT DOCUMENTS

| 5,601,715 | A  | * | 2/1997 | Middleton | ............ | B01D 29/05 |
| | | | | | | 210/469 |
| 5,837,022 | A  | * | 11/1998 | Chapman | .......... | B01D 46/0006 |
| | | | | | | 55/497 |
| 6,623,540 | B2 | * | 9/2003 | Clayton | ................ | B01D 46/10 |
| | | | | | | 55/DIG. 35 |
| 6,916,352 | B2 | * | 7/2005 | Sutton | .................... | B01D 46/12 |
| | | | | | | 55/483 |
| 7,727,299 | B2 | * | 6/2010 | Knowles | ............. | B01D 46/523 |
| | | | | | | 55/DIG. 35 |
| 8,834,611 | B1 | * | 9/2014 | Dimicelli | ........... | B01D 46/0013 |
| | | | | | | 55/497 |
| 10,603,616 | B1 | * | 3/2020 | Nance | ................ | B01D 46/0002 |
| 10,641,520 | B2 | * | 5/2020 | Conrad | ............. | B01D 46/0041 |

(Continued)

OTHER PUBLICATIONS

Rosenthal, Jim. "Air Filter Testing: MERV is not a game show host or an ancient city in Central Asia." Allergy Clean Environments, Allergy, Air & More, Jan. 24, 2009, www.allergyclean.com/air-filter-testing-merv-is-not-a-game-show-host-or-an-ancient-city-in-central-asia/.

(Continued)

*Primary Examiner* — Minh Chau T Pham
(74) *Attorney, Agent, or Firm* — Pearson IP; Loren Donald Pearson

(57) ABSTRACT

An air filter guard includes a downwind rim that supports an air filter in a filter box of an HVAC air handler. The downwind rim prevents the air filter from deforming, bending, or buckling to create gaps that allow air to bypass the air filter. In particular, the air filter guard prevents an air filter from deforming, bending, or buckling even when the air filter is overdue for replacement and clogged with dust. The air filter guard acts as a sleeve in which an air filter is inserted. The air filter guard and air filter are then placed in the filter box of an air handler. The air filter guard has inner dimensions that are large enough to receive the air filter while the outer dimensions of the air filter guard are small enough to fit within the filter box.

22 Claims, 8 Drawing Sheets

(56) References Cited

U.S. PATENT DOCUMENTS

| | | | |
|---|---|---|---|
| 10,773,197 B1* | 9/2020 | Bishop | F24F 13/085 |
| 10,940,417 B1* | 3/2021 | Bishop | B01D 46/0006 |
| 10,981,099 B2* | 4/2021 | Gregerson | B01D 46/0002 |

OTHER PUBLICATIONS

NAFA Technical Committee. "Understanding MERV." National Air Filtration Association, Oct. 2018, www.nafahq.org/understanding-merv/.

* cited by examiner

AIR FILTER GUARD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention relates to air filters for air handlers in heating, ventilating, air-conditioning (HVAC).

Description of the Related Art

Air filters are used to filter dust and other pollutants from air that is pulled into an air handler in a HVAC system. The air filter has a body made of a woven material: for example, fiberglass. The body acts as the filter media. A cardboard rim frames the body and adds rigidity to the air filter. Reinforcing wires are added on the downwind face of some air filters to add rigidity. In some air filters, the body is pleated.

The air filter is placed in a filter box, which is located upwind from the air handler. The filter box is fixed in the plenum of the air handler. When an air filter is placed in the filter box and the air filter is operating optimally, all the air being sucked into the air handler is first being filtered by the air filter. The filtered particulates and dust accumulate on the air filter. The air filter is replaced periodically to provide continued filtering of the air.

A filter box is defined for a standard sized air filter. In the United States, one of the most common large-sized air filters is twenty by twenty by one inches (20×20×1 inches), which equals 51 cm×51 cm×2.5 cm. Air filters can be made with any dimensions; some examples of the most common sizes range between 17.4-102 cm long, 25-107 cm wide, and 1.3-15 cm thick. Large air filters, which are susceptible to bending and failure, are sized from 16×20×1 inches and larger. The most popular sizes of large air filters that are likely to fail include the following sizes: 10×20, 14×20, 16×24, 18×30, 12×12, 14×24, 16×25, 20×20, 12×20, 14×25, 18×18, 20×24, 12×24, 14×30, 18×20, 20×25, 12×30, 15×20, 18×24, 20×30, 12×36, 16×20, 18×25, 4×24, and 25×25, and these sizes range in depth from 1 to 6 inches. The size of an air filter as marketed on the air filter is referred to as the air filter's "marketed size". It is important to note that even though an air filter has a marketed size, the "actual size" of the air filter is smaller in each dimension. The "actual size" of the air filter is the true size of the air filter. Manufacturer's intentionally make the actual size of air filters to be less than the marketed size to guarantee that an air filter will fit even if the filter box is not actually its advertised size. For example, an air filter sold under the Model 10055012020 by Flanders has a marketed size of 20×20×1 inches, but an actual size of 19⅝×19⅝×¾ inches; both the marketed size and actual size are printed on the air filter. An air filter sold under the Model FPR 9 by Honeywell has a marketed size of 20×20×1 inches and an actual size of 19¾×19¾×¾ inches. Air filter sold under the trademark DUST & POLLEN HIGH PERFORMANCE INDOOR AIR FILTER by Rheem has a marketed size of 20×20×1 inches and an actual size of 19¾×19¾×¾ inches.

The air filter will stop working optimally if it is not regularly replaced. After extended use without replacement, so much dust and particulates will accumulate on the air filter, that the air flow will be blocked. As a result, the air filter will produce a vacuum downwind of the air filter. When the vacuum becomes great enough, the air filter buckles or bends. Either way, unfiltered air can flow around the air filter without being filtered. As unfiltered air reaches the coil (i.e. the heat exchanger) in the air handler, the dust and particulates in the unfiltered air accumulate on the coil itself. As dust accumulates on the coils, the performance of the air handler to perform heat transfer is significantly decreased. The decrease in performance leads to unsatisfactory heating and cooling and higher energy costs.

The cost of cleaning a blocked coil is significant. Typically, a blocked coil is acid washed to remove the buildup. The acid wash process is expensive and labor intensive. An unintended consequence of acid cleaning is a weakening of the coil. In some cases, the coil even may need to be removed, cleaned, and welded back into place.

In light of the consequences of failing to change HVAC air filters, most home owners and building owners will do their best to replace their air filters on schedule. On the other hand, renters have very little incentive to change their air filters. For renters, changing the air filter requires purchasing the air filter and spending the time to change the filter. However, renters typically will not remain tenants long enough to see the benefits of maintain the air handler. In addition, renters are often not responsible for utility costs such as electricity. As a result of poor filter maintenance and the resulting air filter failure, many landlords are faced with increased maintenance and energy costs. These costs are ultimately passed back to subsequent tenants.

Property managers are hired by landlords to repair fault HVAC units and to maintain their operation, while routine replacement is optimal, a need exists to provide a way to prevent air filters from buckling and bending even after they have been poorly maintained.

FIG. 1 shows an air filter 100 according to the prior art. The air filter 100 is seated in a filter box 210 of an air handler 200. The air filter 100 is shown in a buckled condition. As a result of the air filter 100 being buckled, air being sucked into the air handler 200 can bypass the air filter 100 and flow, unfiltered into the air handler 200.

FIG. 2 shows a filter box 210 according to the prior art. An air filter 100 is seated in the filter box 210. The air filter 100 has a cardboard rim 102. The cardboard rim 102 holds pleated filter media 105. The air filter 100 is buckled. As a result, a gap 110 exists between the cardboard rim 102 of the air filter 100 and an inner wall of the filter box 210. Air can bypass the air filter 100 by flowing through the gap 110.

FIG. 5 shows an air handler 200 with a front facing filter box 200. The filter box 210 includes a filter-box rim 212. The air filter 100 rests against the filter box rim 212. The filter box 210 includes a filter box lip 213 that holds a bottom edge of the air filter 100 in the filter box 210. As shown in FIG. 5, the air filter 100 can become skewed in the filter box 210. When the air filter 100 is skewed, gaps 110 are created. Airflow can bypass the air filter 100 by passing through the gaps 110. FIG. 5 shows the width of the filter box $w_{fb}$, which equals the distance between the inner walls of the filter box 210. The width of the filter box rim $w_{fbr}$ equals the distance between the inside edges of the left and right filter-box rims 212. The length of the filter box $l_{fb}$ equals the distance between the top and bottom walls of the filter box 210. The length of the filter box rim $l_{ifb}$ equals the distance between the inside edges of the left and right filter-box rims 212.

As shown by the examples of buckled air filters, a need exists to reinforce disposable air filters without adding to the cost of the air filters and without requiring to existing HVAC systems.

BRIEF SUMMARY OF THE INVENTION

An object of the invention is to provide an air filter guard that overcomes the disadvantages of the devices and methods of this general type and of the prior art.

More specifically, an object of the invention is to provide a support for an air filter that guarantees continued filter of air by preventing the air filter from buckling and bending, even when the air filter is clogged with dust and additional filtrates.

A further object of the invention is to provide a support for an air filter that blocks as little air flow as possible without risking a failure as a support.

A further object of the invention is to provide a support for an air filter that works with existing air filters and filter boxes.

A further object of the invention is to provide a means for easing the insertion of an air filter in a filter box.

A further object of the invention is to provide a means for confirming to an installer that an air filter is fully inserted in the filter box.

A further object of the invention is to provide a means for preventing collected condensation overflowing from a clogged drip pan from contacting a frame of an underlying air filter.

With the foregoing and other objects in view there is provided, in accordance with the invention, a frame guard for supporting an air filter in a filter box when air moves through the air filter. The frame guard includes a downwind rim. The term "downwind" is defined by a direction of air flow through the air filter. The downwind rim is configured to be inserted into the filter box, downwind from the air filter. The downwind rim is configured to support a downwind face of the air filter when the air moves through the air filter. Even if the air filter becomes clogged and air stops flopping, the downwind rim is configured to support the downwind face of the air filter against the pull of the air handler or the push of an upwind fan. The downwind rim defines a periphery around the frame guard, that is parallel to the plane of the (unbuckled/unbent) air filter. The downwind rim has a passage formed through the rim for allowing the air from the air filter to pass through the downwind rim.

The periphery has a periphery width. The periphery width is no greater than a filter-box inner width of the filter box. By being no greater than the filter box inner width, the rim fits and can be slid between the lateral walls of the filter box. In embodiments, where only a portion of the downwind rim is inserted fully in the filter box, the periphery width can be defined as the width of the portion of the periphery that is inserted in the filter box. The periphery width is also greater than a filter-box-rim opening width of the filter box. By being wider than the filter-box-rim opening width, no air can bypass the downwind rim. The periphery width further can be wide enough to minimize any play between the downwind rim and the lateral walls of the filer box in order to prevent a gap through which air could bypass the air filter.

The downwind rim has a downwind-rim height. The downwind-rim height is limited so that the downwind-rim height plus an air-filter height of the air filter is less than a filter-box inner height of the filter box.

The downwind rim is configured to have a stiffness that is great enough to prevent the downwind rim from buckling to a width narrower than the filter-box-rim opening width when the downwind rim is inserted in the filter box downwind from the air filter and the air is moving through the air filter under the intended pressures and flows of the air handler.

The downwind rim has a tensile strength. The tensile strength is great enough to prevent the downwind rim from bending when the downwind rim is inserted in the filter box downwind from the air filter and the air is moving through the air filter under the normal operating pressures and flows of the air handler.

The frame guard can include a beam for supporting the downwind face of the air filter. The beam extends from the rim into the passage. The beam limits any possible curvature of an air filter in the passage by supporting the downwind face of the air filter as it deforms.

The beam can have two ends with each of the two ends being connected to the rim. The beam is strengthened and is less susceptible to shear being connected at two locations on the downwind rim. By reducing shear on the beam by connecting it at two points, the beam itself can be made narrower, yet remain strong. Narrowing the beam reduces the obstruction of air flow through the downwind rim.

The periphery of the downwind rim has a periphery length, which is defined as the length of the periphery along a direction of insertion of the downwind rim into the filter box. The periphery length can be sized to be no greater than a filter-box length of the filter box. Limiting the periphery length insures that the downwind rim does not extend outside of the filter box in a way that the air-filter alone was not intended to do.

One way to provide a rim with the requisite strength and rigidity at the prescribed size, is to select a material that meets the criteria. Forming the downwind rim of a resin has been found to be effective. Low-density polyethylene is a resin that meets the strength requirements at the given size. When choosing a material for the downwind rim, additional factors such as cost and water-resistance of the material should be considered.

The frame guard can have a periphery that is shaped like the periphery of the air filter. If the shape (i.e. planar projection) of the filter is rectangular, the periphery of the downind rim can be rectangular. The shape is "like" the shape of the air filter because the actual size and relative dimensions of the downwind rim might differ from the size and relative dimensions of the air filter.

The downwind rim can be frame shaped or generally frame shaped in which case the downwind-rim can have a width. The downwind-rim width can be wide enough to cover an air-filter rim of the air filter when said downwind rim overlies the air filter. By extending inward to at least as wide as the underlying air filter, even including any play that the air filter may have in the filter box, the downwind rim can prevent any liquid from the air handler from dripping or spilling onto the cardboard frame of the air filter. In a vertically, arranged air handler, an air-conditioner coil is diagonally mounted above the filter box. A drip plan is placed beneath the lowest edge of the coil to collect condensation from the coil. If a drain of the drip pan becomes clogged, the collected condensation will back up and spill from the drip pan. When sized to underly the drip pan, the downwind rim can prevent any condensation from spilling onto the cardboard frame of the air filter.

In accordance with the objects of the invention, the downwind-rim width can be sized to be wide enough to cover the carboard frame, but not too wide to extend narrower, past the cardboard frame. Limiting the width of the downwind rim to the inner edge of the cardboard frame of the air filter prevents the downwind rim from blocking air passing through the air filter.

Because the drip pan may not overly only the cardboard frame of the air filter but additional parts of the air filter as well. The downwind-rim width can be extended to underlie completely a drip pan of the air handler.

Other features that are considered as characteristic for the invention are set forth in the appended claims.

Although the invention is illustrated and described herein as embodied in an air filter guard, the invention should not be limited to the details shown in those embodiments because various modifications and structural changes may be made without departing from the spirit of the invention while remaining within the scope and range of equivalents of the claims.

The construction and method of operation of the invention and additional objects and advantages of the invention is best understood from the following description of specific embodiments when read in connection with the accompanying drawings.

DETAILED DESCRIPTION OF THE INVENTION

Figure 1:
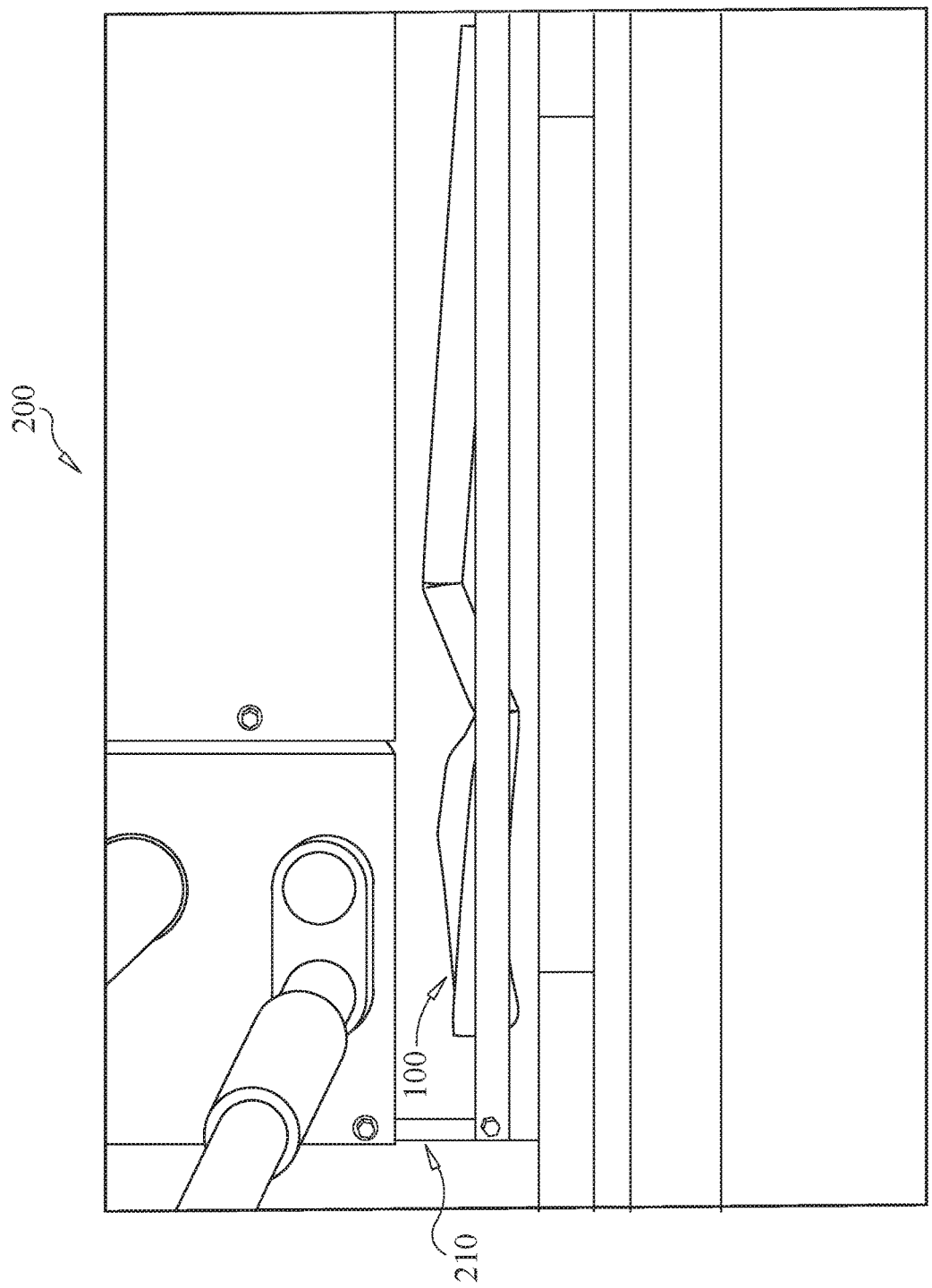
FIG. 1 is a diagrammatic, front, elevational view of an air handler according to the prior art showing an air filter in a buckled condition.
Figure 2:
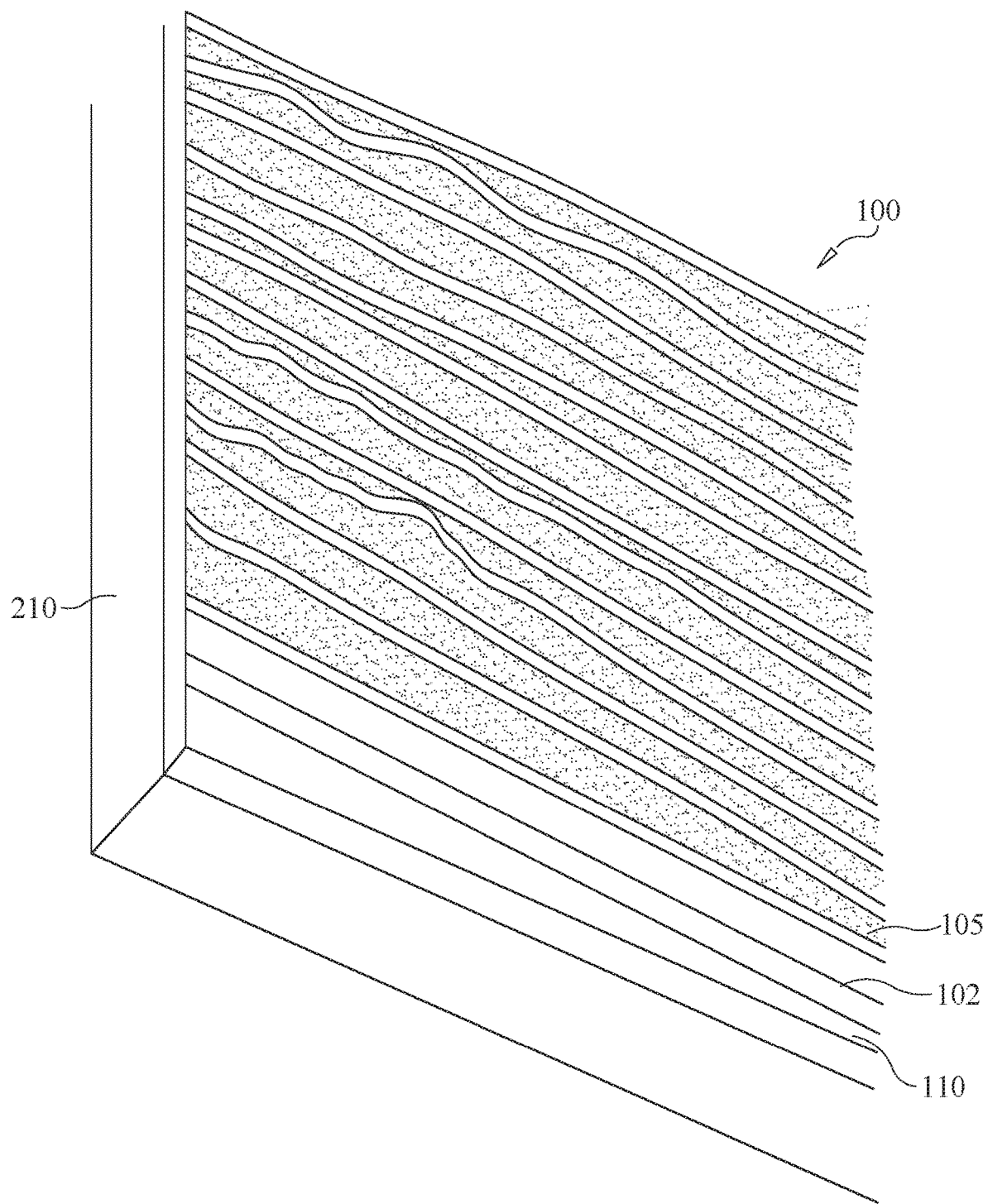
FIG. 2 is a partial, bottom, right, front perspective view of a filter box according to the prior art showing an air filter in a buckled condition.
Figure 3:
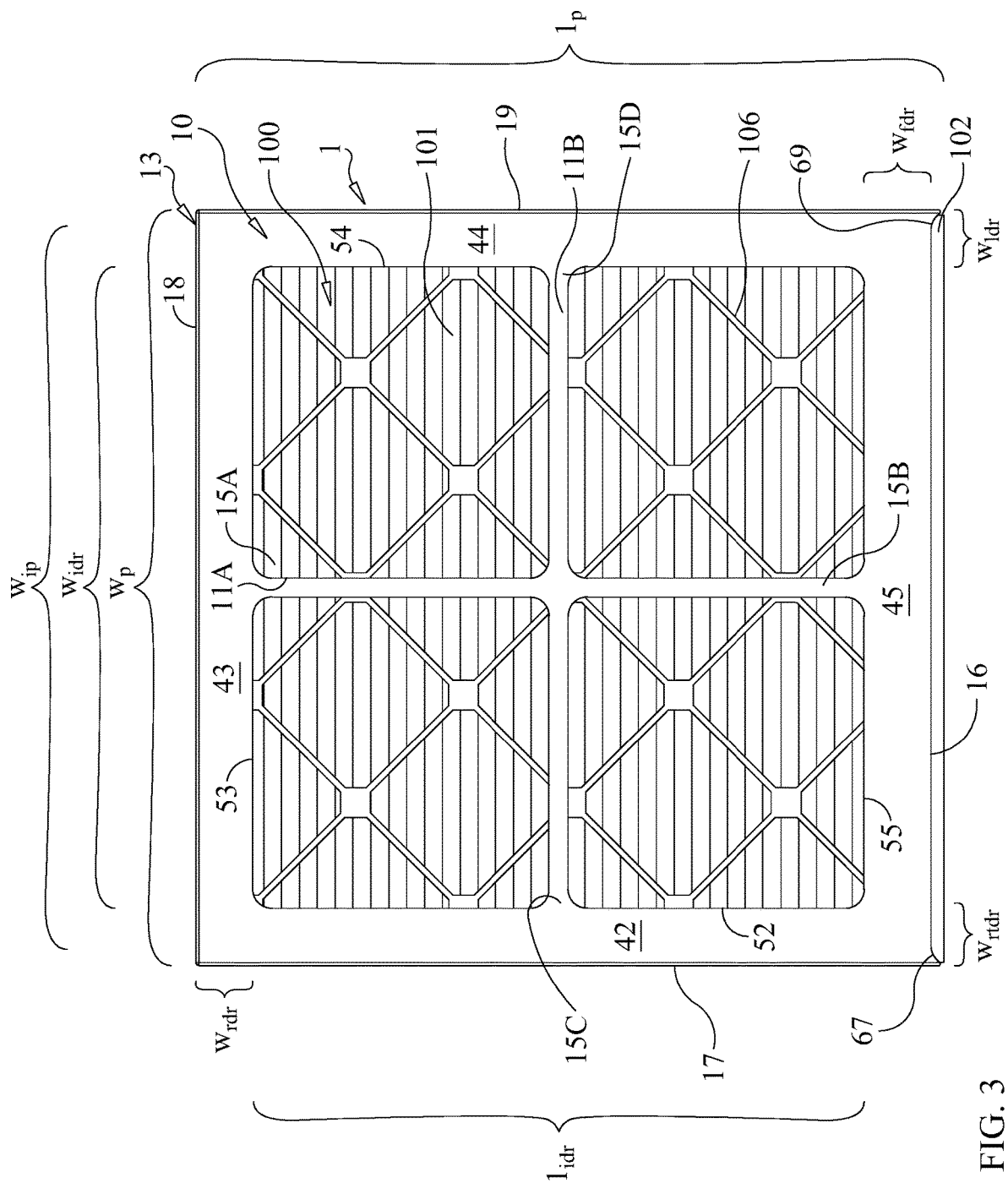
FIG. 3 is a top elevational view of an air filter guard according to the invention with an air filter inserted in the air filter guard.
Figure 4:
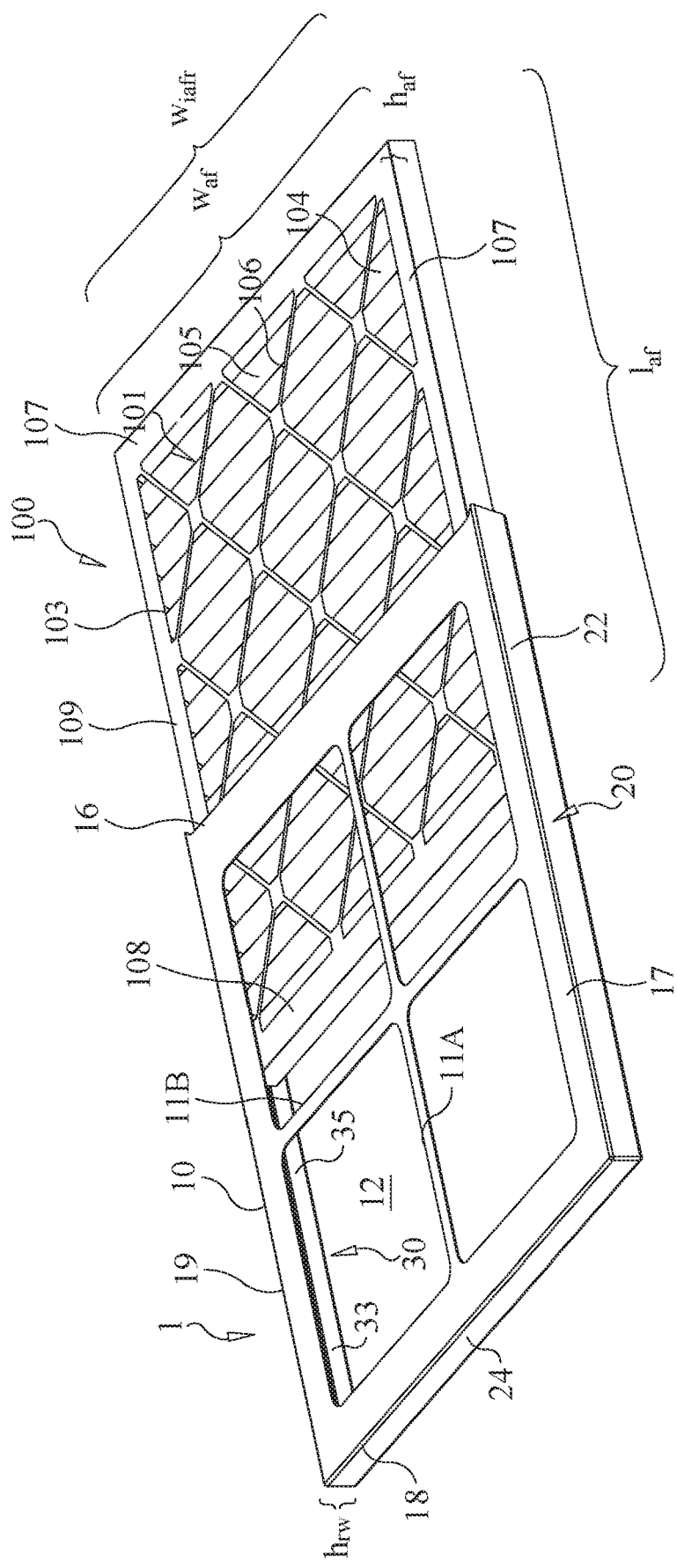
FIG. 4 is a top, rear, right perspective view of the air filter guard shown in FIG. 3 with the air filter partially inserted in the air filter guard.
Figure 5:
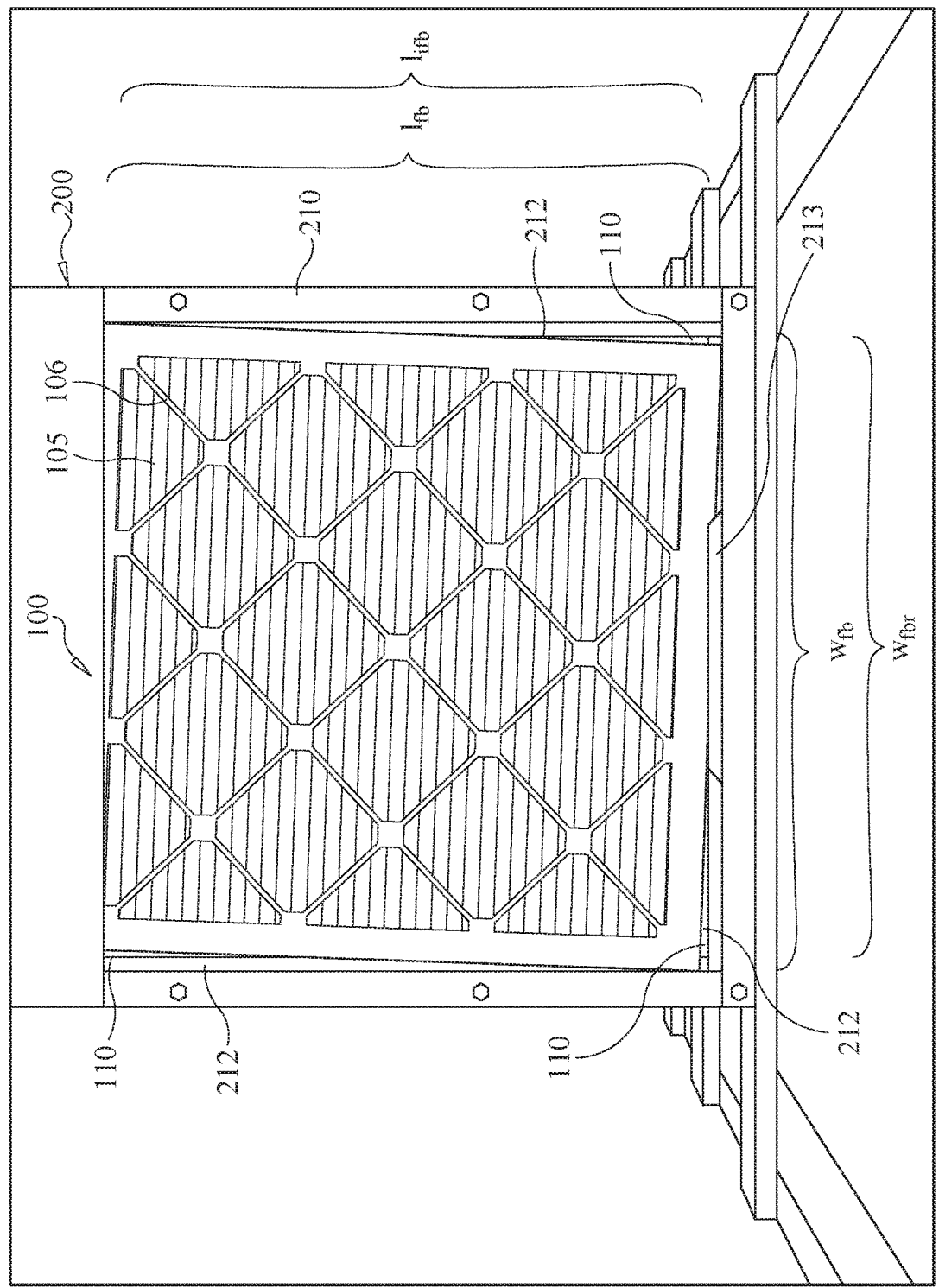
FIG. 5 is a partial, front, perspective view of a front-filter air handler and an air filter, both according to the prior art.

FIG. 3 shows a preferred embodiment of an air filter guard 1. The air filter guard 1 has a downwind-rim 10 that has a periphery 13 that is rectangular. The periphery 13 includes a front edge 16, a right edge 17, a rear edge 18, and a left edge 19. The downwind rim 10 includes a front downwind rim 45, a right downwind rim 42, a rear downwind rim 43, and a left downwind rim 44. The front downwind rim 45 has a front-downwind-rim inner edge 55. The right downwind rim 42 has a right-downwind-rim inner edge 52. The rear downwind rim 43 has a rear-downwind-rim inner edge 53. The left downwind rim 44 has a left-downwind-rim 54. A right-downwind-rim width $w_{rdr}$ is the distance between the right edge 17 and the right-downwind-rim inner edge 52. A rear-downwind-rim width $w_{rdr}$ is the distance between the rear edge 18 and the rear-downwind-rim inner edge 53. A left-downwind-rim width $w_{ldr}$ is the distance between the left edge 19 and the left-downwind-rim inner edge 54. A front-downwind-rim width $w_{fdr}$ is the shortest distance between the front edge 16 and the front-downwind-rim inner edge 55. The right-downwind-rim inner edge 52, the rear-downwind-rim inner edge 53, the left-downwind-rim inner edge 54, and the front-downwind-rim inner edge 55 define a hole 12 therebetween as shown in FIG. 4. A first beam 11A and a second beam 11B span the hole 12. The first beam 11A is connected at a first end 15A to the rear downwind rim 43 and at a second end 15B to the front downwind rim 45. The second beam 11B is connected at a first end 15C to the right downwind rim 42 and at a second end 15D to the left downwind rim 44. A right rearward edge 67 declines rearward from the right edge 17 to the front edge 16. A left rearward edge 69 declines rearward from the left edge 19 to the front edge 16. A periphery width $w_p$ is defined as the distance between the right edge 17 and the left edge 19, which equals in this embodiment the width of the rear edge 18. A periphery length $l_p$ is defined as the distance between the rear edge 18 and the furthest points of the right rearward edge 67 and left rearward edge 69, which in this embodiment equals the lengths of the right edge 17 and the left edge 19. An inner downwind-rim width $w_{idr}$ is defined between the right-downwind-rim inner edge 52 and the left-downwind-rim inner edge 54. An inner downwind-rim length $l_{idr}$ is defined between the rear-downwind-rim inner edge 53 and the left-downwind-rim inner edge 55.

In FIG. 3, the air filter guard 1 is shown holding an air filter 100. A downwind face 101 of the air filter 100 is visible through the holes 12. The air filter 100 includes a lattice 106 of reinforcements. An air-filter front rim 102 can be grasped to extract the air filter 100 from the air filter guard 1.

In FIG. 4, the air filter guard 1 is shown with the air filter 100 partially inserted (which is the same as being partially removed) from the filter guard 1. A wall 20 is formed by a right wall 22, a left wall 23 (which is not visible in FIG. 4 but which is a mirror-image of right wall 22), and rear wall 24. An upwind rim 30 is connected to the wall 20. The upwind rim 30 includes left upwind rim 33. A rear-wall height $h_{rw}$ is defined as a distance between the downwind rim 10 and the upwind rim 30. As shown in FIG. 3, a periphery inner width $w_{ip}$ is the distance between an inner surface of the right wall 22 and an inner surface of the left wall 23.

In FIG. 4, the air filter 100 is shown. The downwind face 101 of the air filter 100 is shown facing the downwind rim 10 of the air filter guard 1. The air filter 100 has an air-filter front rim 102, an air-filter right rim 107, an air-filter rear rim 108, and an air-filter left rim 109, which are made of cardboard. The air-filter right rim 107 has a right inner edge 104. The air-filter left rim 109 has a left inner edge 103. Fiberglass filter media 105 is secured by the air-filter front rim 102, the air-filter right rim 107, the air-filter rear rim 108, and the air-filter left rim 109. The lattice 106 supports the downwind face 101. As shown in FIG. 4, the air filter 100 has an air-filter width $w_{af}$, an air-filter length $l_{af}$, and an air-filter height $h_{af}$. The air-filter-rim inner width $w_{iafr}$ is the distance between the left inner edge 103 and the right inner edge 104.

In the embodiment in FIGS. 3 and 4, the perimeter inner width $w_{ip}$ is greater than the air-filter width $w_{af}$. The inner downwind-rim width $w_{idr}$ equals the air-filter-rim inner width $w_{iafr}$.

Figure 6:
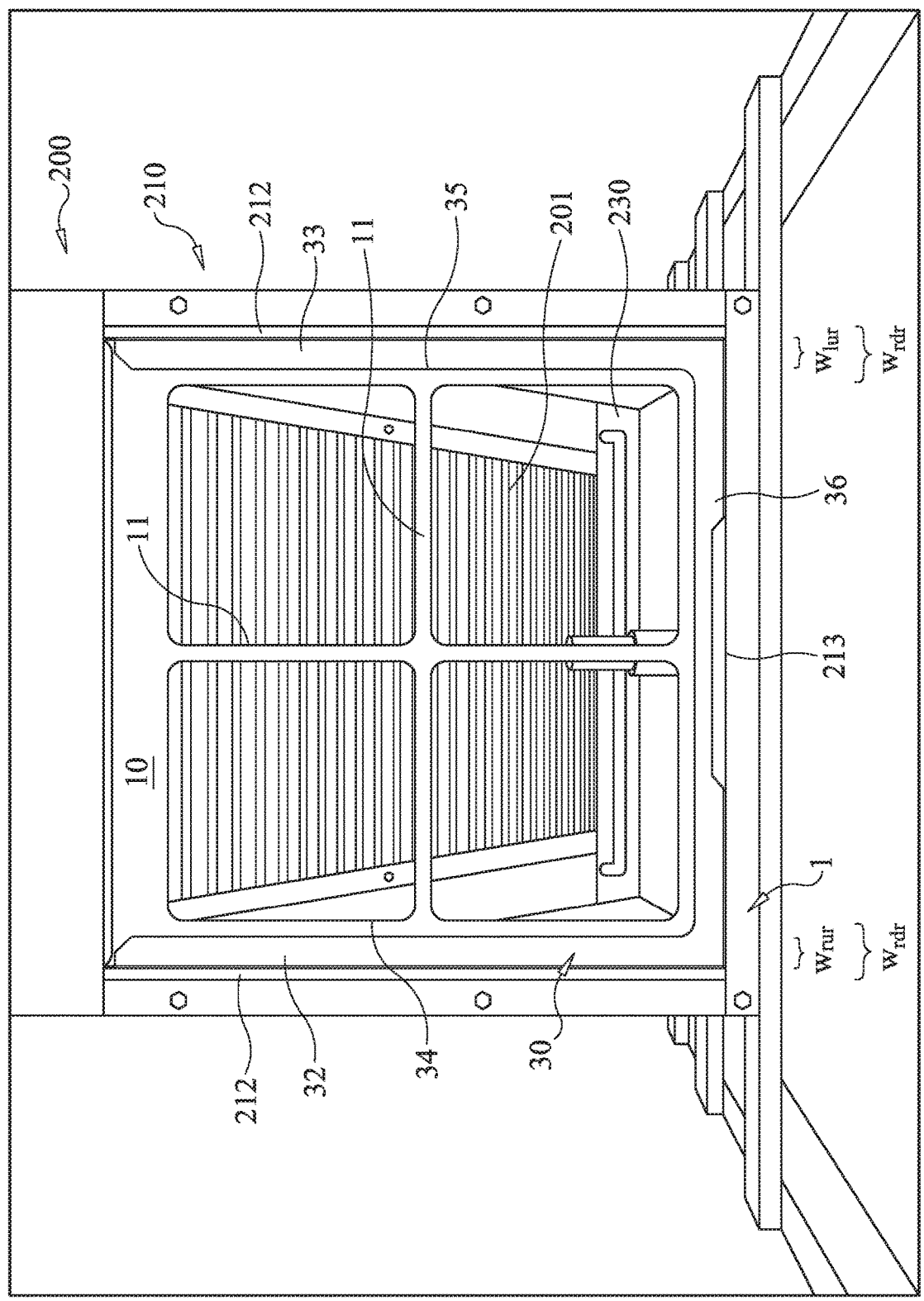
FIG. 6 is a top elevational view of the air filter guard shown in FIG. 3 seated in a front-filter air handler, the filter guard having no air filter inserted therein.

FIG. 6 shows a preferred embodiment of an air filter guard 1 seated in an air handler 200 with a front facing filter box 210. While an air filter would be inserted in the air filter guard 1 during normal operation of the air handler 200, no air filter is shown in this view for purposes of illustration. The air filter guard 1 includes a downwind rim 10 that has two intersecting beams 11. The filter box 210 includes a recessed filter-box rim 212. The downwind rim 10 rests against the recessed filter-box rim 212. A filter-box lip 213 holds the filter guard 1 in the filter box 210. An upwind rim 30 includes a right upwind rim 32, a left upwind rim 33, and a rear upwind rim 36. The right upwind rim 32 has a right-upwind-rim inner edge 34. The left upwind rim 33 has a left-upwind-rim inner edge 35. A right upwind rim width $w_{rur}$ is defined between the right wall 22 and the right-upwind-rim inner edge 34. A left upwind rim width $w_{lur}$ is defined between the left wall 23 and the left-upwind-rim inner edge 35.

The width of the perimeter $w_P$ is less than an inner width of the filter box. The width of the perimeter $w_P$ is greater than the width between the filter-box rims 212. The width of the perimeter $w_P$ is greater than the inner width of the filter box rim $w_{ifbr}$ less the width of the right rim of the filter box $w_{rrfb}$; and the width of the perimeter wp is greater than the inner width of the filter box web less the width of the left rim of the filter box $w_{lrfb}$.

Figure 7:
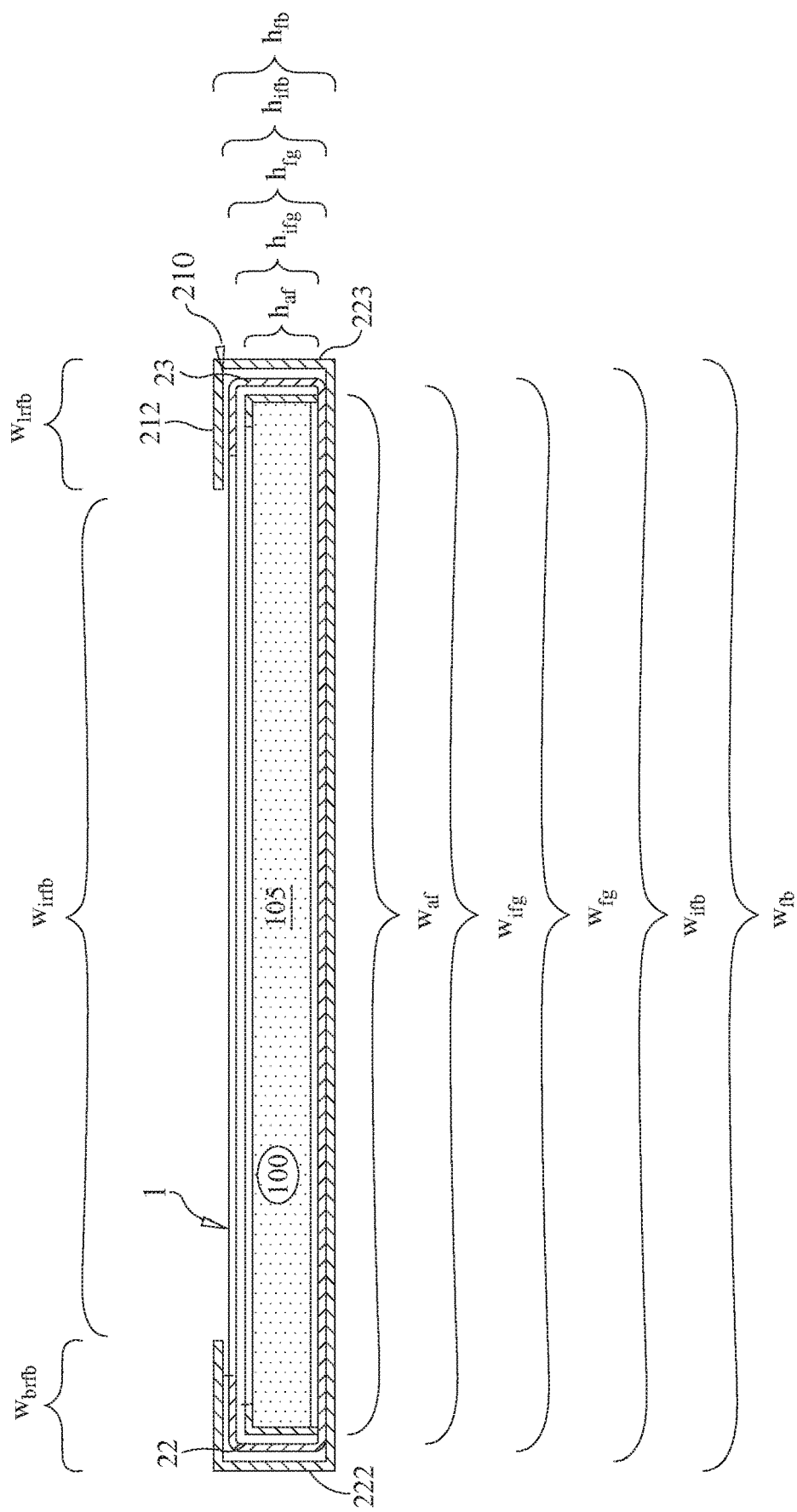
FIG. 7 is a front sectional view of the air filter guard shown in FIG. 3 seated in a bottom-filter air handler.

FIG. 7 shows a preferred embodiment of the air filter guard 1 while holding an air filter 100 and while being seated in a filter box 210. FIG. 7 shows the width of the air filter $w_{af}$, the inner width of the filter guard $w_{ifg}$, the width of the filter guard $w_{fg}$, the inner width of the filter box with, and the width of the filter box $w_{fb}$. FIG. 7 further shows the height of the air filter $h_{af}$, the inner height of the air filter guard $h_{ifg}$, the height of the air filter guard $h_{fg}$, the inner height of the filter box $h_{ifb}$, the height of the filter box $h_{fb}$. An inner width of the filter guard $w_{ifg}$ is defined between the interiors of right wall 22 and left wall 23.

Figure 8:
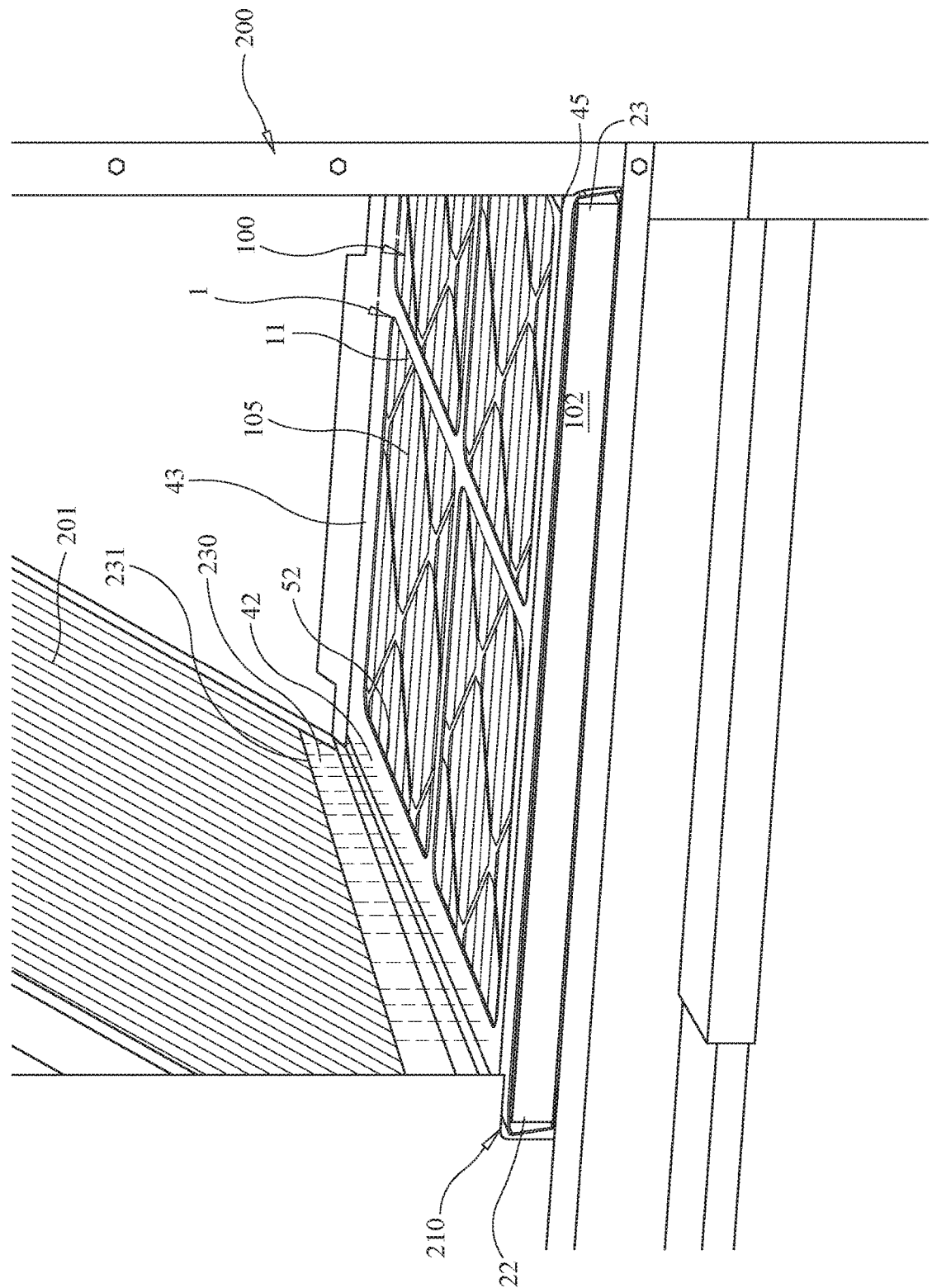
FIG. 8 is a top, front, left perspective view of the air filter guard shown in FIG. 3 when inserted in an air handler with a bottom filter box.

FIG. 8 shows an air handler 200 with a filter box 210 at the bottom of the air handler 200. An air filter guard 1 has an air filter 100 inserted in the air filter guard 1. The air filter guard 1 is inserted in the filter box 210. The air filter guard 1 has a right downwind rim 42, a rear downwind rim 43, and a front downwind rim 45. The air-filter front rim 102 is visible at the front of the air filter guard 1. The air handler 200 has a coil 201. Condensation from the coil 201 collects in a drip pan 230. If a drain of the drip pan 230 becomes clogged, the drip pan 230 fills and eventually spills over the drip pan rim 231. The right-downwind-rim inner edge 52 of the right downwind rim 42. The right-downwind-rim inner edge 52 extends inward beyond where water spilling from the drip 230 falls. As a result, the right downwind rim 42 protects the underlying cardboard air-filter rim 107 of the air filter 100 and prevents the cardboard from being dissolved by the spillover.

A preferred embodiment of an air filter guard for a 20×20×1 inch air filter (i.e. a 19.75×19.75×0.75 inch manufactured size) would have the following dimensions. The width of the perimeter $w_P$ is 19.875 inches. The length of the perimeter $l_P$ is 19.9735 inches. The height of the wall $h_W$ is 0.875 inches. The downwind-rim height $h_{dr}$ is 0.0625 inches. The downwind rim width is $w_{dr}$ is 1.375 inches. A width of the wall 20 is 0.0625 inches. A height of the upwind rim 30 is 0.0625 inches.

What is claimed is:

1. An air filter guard for supporting an air filter in a filter box when air moves through the air filter, comprising:
a downwind rim for inserting into the filter box downwind from the air filter, said downwind rim being configured to support a downwind face of the air filter when the air moves through the air filter, said downwind rim defining a periphery, said downwind rim having a passage formed therethrough for allowing the air from the air filter to pass through said downwind rim; and
said periphery having a periphery width, said periphery width being no greater than a filter-box inner width of the filter box and greater than a filter-box-rim opening width of the filter box;
said downwind rim having a downwind-rim height, said downwind-rim height plus an air-filter height of the air filter being less than a filter-box inner height of the filter box;
said downwind rim having a stiffness, said stiffness being great enough to prevent said downwind rim from buckling and becoming narrower than the filter-box-rim opening width when said downwind rim is inserted in the filter box downwind from the air filter and the air is moving through the air filter; and
said downwind rim having a tensile strength, said tensile strength being great enough to prevent said downwind rim from bending when said downwind rim is inserted in the filter box downwind from the air filter and the air is moving through the air filter.

2. The air filter guard according to claim 1, further comprising a beam for supporting the downwind face of the air filter, said beam extending from said rim into said passage.

3. The air filter guard according to claim 2, wherein said beam has two ends, each of said two ends being connected to said rim.

4. The air filter guard according to claim 1, wherein said periphery has a periphery length, said periphery length being no less than a filter-box-rim length of the filter box.

5. The air filter guard according to claim 1, wherein said downwind rim is formed of a resin.

6. The air filter guard according to claim 5, wherein said resin is low-density polyethylene.

7. The air filter guard according to claim 1, wherein said periphery is rectangular.

8. The air filter guard according to claim 1, wherein:
said downwind rim has a downwind-rim width; and
said downwind-rim width is wide enough to cover an air-filter rim of the air filter when said downwind rim overlies the air filter.

9. The air filter guard according to claim 8, wherein said downwind-rim width is narrow enough to cover approximately only the air-filter rim.

10. The air filter guard according to claim 1, wherein:
said downwind rim has a downwind-rim width; and
said downwind-rim width is great enough to underlie completely a drip pan of the air handler, the drip pan being disposed downwind and above the filter box.

11. The air filter guard according to claim 1, further comprising:
a wall extending upwind from said downwind rim, said wall having a wall height, said wall height being less than a filter-box inner height of the filter box; and
an upwind rim extending inward from said wall.

12. The air filter guard according to claim 11, wherein said upwind rim declines from said wall toward said downwind rim.

13. The air filter guard according to claim 11, wherein said upwind rim is flexible and resilient.

14. The air filter guard according to claim 11, wherein a height of said wall is at least equal to an air-filter height of the air filter.

15. The air filter guard according to claim 7, wherein:
said periphery has a front edge, a right edge connected to said front edge, a rear edge connected to said right edge and opposing said front edge, and a left edge connected to said rear edge, said left edge opposing said right edge;
a right wall extending upwind from said right edge, said right wall having a right-wall height no greater than a filter-box inner height of the filter box;
a left wall extending upwind from said left edge, said left wall having a left-wall height no greater than the filter-box inner height of the filter box;
a right upwind rim extending inward from said right wall, said right upwind rim having a right-upwind-rim width and a right-upwind-rim inner edge; and
a left upwind rim extending inward from said left wall, said left upwind rim having a left-upwind-rim width and a left-upwind-rim inner edge;
said right-upwind inner edge and said left-upwind inner edge defining an upwind-rim inner width therebetween, said upwind rim inner width spanning less than an air-filter width of the air filter.

16. The air filter guard according to claim 15, further comprising a rear wall extending upwind from said rear edge, said rear wall having a rear-wall height no greater than the inner height of the filter box.

17. The air filter guard according to claim 16, further comprising a rear upwind rim extending inward from said rear wall.

18. The air filter guard according to claim 17, wherein said rear upwind rim interconnects said right upwind rim and said left upwind rim.

19. The air filter guard according to claim 15, wherein:
said left upwind rim extends inward no further than a left inner edge of an air filter rim of the air filter; and
said right upwind rim extends inward no further than a right inner edge of the air filter frame of the air filter.

20. A method for preventing an air filter in a filter box from deforming and allowing air to reach an air handler without filtering, which comprises:
placing a beam against a downwind face of an air filter;
spanning a filter box downwind from the air filter with said beam, said bean supporting a downward face of the air filter when the air handler is operating, said beam having a stiffness great enough to prevent the air filter from buckling to a width narrower than the filter box rim opening width when the air filter is being operated, said beam having a tensile strength great enough to prevent said beam from bending when the air handler is operated, and
defining a passage in the filter box with said beam, said passage allowing air to flow from the air filter to the air hander.

21. The method according to claim 20, which further comprises:
providing a rectangular frame guard, said rectangular frame guard including:
a downwind rim defining a periphery, said downwind rim having a passage formed therethrough for allowing air from the air filter to pass through said downwind rim to said air handler; said periphery having a width no greater than an inner width of the filter box and greater than a filter-box-rim opening width of said filter box; said rim having a rim thickness, said rim thickness plus an air-filter thickness of the air filter being no greater than a filter-box inner height of the filter box; said rim having a stiffness, said stiffness being great enough to prevent said rim from buckling to a width narrower than the filter-box-rim opening width when said rim is inserted in the filter box downwind the air and the air hander pulls air through said rim and the air filter;
said periphery including a front edge, a left edge connected to said front edge, a rear edge connected to said left edge and opposing said front edge; a right edge being interconnected said rear edge and said front edge and opposing said left edge;
a right wall extending upwind from said right edge, said right wall having a height no greater than an inner height of the filter box;
a left wall extending upwind from said left edge, said left wall having a height no greater than the inner height of the filter box;
a right upwind rim extending inward from said right wall, said right upwind rim having a width and an inner edge; and
a left upwind rim extending inward from said left wall, said left upwind rim having a width and an inner edge;
a rear wall extending upwind from said rear edge, said rear wall having a height no greater than the inner height of the filter box;
a right upwind rim extending inward from said right wall, said right upwind rim having a width and an inner edge; and
a left upwind rim extending inward from said left wall, said left upwind rim having a width and an inner edge;
said beam spanning said passage in said periphery and being connected to two of said front edge, said left edge, said rear edge, and said right edge;
sliding the air filter into said air filter guard between said rim and said right upwind rim and said left upwind rim until a rear of the air filter abuts said rear wall before inserting said air filter into the filter box; and
inserting said air filter guard into the filter box while said air filter guard holds the air filter.

22. The method according to claim 21, which further comprises:
passing air through said air-filter guard and the air filter while said air filter guard and the air filter are both inserted in the filter box;
removing said air filter guard and the air filter together from the filter box by sliding said filter guard from the filter box;
removing the air filter from said filter guard;
inserting a replacement air filter in said air filter guard;
inserting the replacement air filter in the filter box by inserting said air-filter guard and air filter together into the filter box; and
passing air through said air-filter guard and the air filter while said air filter guard and the air filter are both inserted in the filter box,
said rim having a tensile strength, said tensile strength being great enough to prevent said rim from bending when said rim is inserted in the filter box downwind the air and the air hander pulls air through said rim and the air filter.

\* \* \* \* \*